3,288,745
COATING COMPOSITION CONTAINING PHENOL-FORMALDEHYDE RESIN AND A POLYETHYLENE GLYCOL
Charles H. Hempel and Herbert E. Pleuss, both of Manitowoc, Wis., assignors to Heresite & Chemical Company, a corporation of Wisconsin
No Drawing. Continuation of application Ser. No. 154,870, Nov. 24, 1961. This application Mar. 5, 1965, Ser. No. 437,548
2 Claims. (Cl. 260—33.2)

This application is a continuation of our application Serial No. 154,870, filed November 24, 1961, and now abandoned, entitled "Coating Composition and Method of Making Same."

This invention relates to a new and improved coating material and more particularly to a new and improved phenolic resin coating material and methods of making the same.

It is the general object of the present invention to produce a new and improved coating composition and new and improved methods of preparing the same.

It is a more specific object of the invention to produce a phenol-formaldehyde coating composition which possesses remarkable adherent properties, particularly when applied to metal surfaces.

It has been well known that phenol-formaldehyde resins, particularly pure phenol-formaldehyde resins, do not adhere well to metal surfaces. To overcome such difficulties, it has been customary in the past to roughen the metal surfaces, for example by sandblasting, prior to the application of the phenolic coating. This is, of course, a time consuming and expensive process and not always available for use.

Adherence of phenolic coatings to metals can be improved by treating the metal object in a dilute solution of alkali metal dichromate in the process described in the Hempel Patent No. 2,535,794, but again, this is an additional step adding to the expense of fabrication.

In the container industry, for example, if the phenolic coating is applied to the metal prior to its formation into containers, the bending and other deformations to which the metal is subjected during the forming operation tends to cause the coating material to flake off and it is not always possible satisfactorily to sandblast or etch the thin gage metal of the containers after they have been formed.

In accordance with the present invention, however, there is produced a pure phenol-formaldehyde resin which will adhere firmly to a metal surface, even one which has not been prepared by sandblasting, roughening, or etching. The resin coating of the present invention will adhere firmly to an unroughened metal surface, even to a phosphatized surface. In addition, the resin coating of the present invention has improved properties of elasticity which causes it to adhere firmly to a metal surface and to withstand the bending and other stresses to which it is subjected when the resin coated metal is subsequently formed such as into a container or can.

The invention hereof is based upon the discovery that the poor adherence and low elasticity of prior phenol-formaldehyde resin coatings can be overcome by the use of polyethylene glycols as plasticizers in the resin. The presence of the polyethylene glycols in the resin coating composition in the amounts hereinafter set forth produces a resin coating which will adhere firmly to unroughened metal surfaces and will retain such an adherence even though the metal to which the coating is applied is subsequently bent, twisted, or even subjected to hammer-like shocks.

As previously indicated, the coating material of the present invention is a combination of a phenolic resin with a polyethylene glycol plasticizer. The phenolic resin may be unpigmented or it may contain an inert pigment and be made by the process disclosed in Hempel Patent No. 2,253,235. The resulting mixture is dissolved in a suitable solvent and utilized to coat metal surfaces, as for example, by spray, roller, or dip coating.

Thus the resin may be formed by mixing together the following ingredients:

| | Parts by weight |
|---|---|
| Phenol | 100 |
| Formaldehyde (40%) | 90–120 |
| Ammonium bicarbonate or sodium carbonate | 2–5 |

The above ingredients are boiled under reflux conditions until the resin precipitates. The condensation is usually continued for about thirty minutes and the resin is then dehydrated under vacuum and the polyethylene glycol plasticizer is then added with constant agitation while maintaining the temperature of the ingredients between 60° C. and 80° C. After about one hour the reaction is complete and the resin mixture may then be thinned with appropriate thinner and cooled to room temperature.

The resultant mixture or resin is dissolved in a suitable solvent before application to the article to be coated. The preferred solvent formula is as follows:

| | Parts by weight |
|---|---|
| Ethyl alcohol | 70 |
| Amyl acetate | 10 |
| Pine oil | 20 |

For application by roller coating a slower solvent may be desired and, therefore, all or part of the ethyl alcohol may be replaced by butyl alcohol. The resin solution may, if desired, be mixed with suitable pigments by grinding in a ball mill until a film of the coating is free of coarse particles. Suitable pigments include burnt sienna, ochre, and titanium dioxide.

The plasticized phenol-formaldehyde resin coating solutions may be applied to the surfaces to be coated by rolling, dipping, or spraying, or any other desired method. After application of the resin coating it is of course necessary to cure the resin to provide the protection desired. Such curing is effected by heating the coated object at an elevated temperature to drive off the volatile solvent and then to cure the resin. Satisfactory curing can be obtained, for example, by baking the coated object in an oven for a period of about 15 minutes at 210°–245° C.

The polyethylene glycols suitable for this purpose are of high molecular weight normally produced by reacting ethylene oxide with ethylene glycol or water. Their structure may be written:

$$HO(C_2H_4O)_nC_2H_4OH$$

Of the various polyethylene glycols available commercially, only those that are liquid at room temperature are suitable in the process, that is, those in the molecular weight range of 200 to 600, with the material having a molecular weight of about 400 being the most desirable. The polyethylene glycol plasticizer is present in the phenol-formaldehyde resin of this invention in an amount equal to 20 to 50 percent by weight of the non-volatile portion of the resin.

Surfaces coated with the plasticized phenol-formaldehyde resin of the present invention possess outstanding chemical resistance characteristics and also offer high electrical resistance. Furthermore, the resin coating of the present invention possesses remarkable properties of flexibility, adhesion and impact resistance. For example, a metal sheet coated with the resin of the present invention has withstood reverse impacts of 60 inch pounds without flaking. A coated metal panel has been bent 180° over a ¼ inch rod without producing cracking or flaking of the resin coating.

The pigmented resin coatings of the present invention also possess excellent chemical resistance. The final coating is unaffected by most acid and salt solutions, such as hydrochloric acid, sulfuric acid up to 70%, metallic sulfates and chlorides, brines, organic acids, and fatty acids, and it is likewise unaffected by practically all organic solvents and chemicals such as ketones, alcohols, halogenated hydrocarbons, esters, and ethers.

A very important feature of the coating of the present invention is the fact that it is non-toxic and therefore may be used as a liner for containers of food products.

While especially useful to the packages of food, the coating of the present invention is of course useful in many other applications, for example, test instruments, and impregnating and laminating chemical processing equipment.

Having described the invention as related to the embodiments set out herein, it is our intention that the invention be not limited by any of the details of description unless otherwise specified, but rather be construed broadly within its spirit and scope as set out in the accompanying claims.

We claim:
1. A coating composition having improved qualities of adhesion to unetched metal surfaces, said coating composition consisting essentially of an alkali phenol-formaldehyde resin having from 90 to 120 parts by weight of formaldehyde to each 100 parts by weight of phenol admixed with 20 to 50 percent by weight of the non-volatiles of the resin of a polyethylene glycol having the formula $HO(C_2H_4O)_nC_2H_4OH$ where $n$ is an integer sufficient to define a molecular weight of from 200 to 600, said admixture being dissolved in a solvent.

2. A coating composition having improved qualities of adhesion to unetched metal surfaces, said coating composition consisting essentially of a phenol-formaldehyde resin having from 90 to 120 parts by weight of formaldehyde to each 100 parts by weight of phenol and from 2 to 5 parts by weight of an alkali salt chosen from the class consisting of ammonium bicarbonate and sodium carbonate to each 100 parts by weight of phenol, all admixed with 20 to 50 percent by weight of the non-volatiles of the resin of a polyethylene glycol having the formula $HO(C_2H_4O)_nC_2H_4OH$ where $n$ is an integer sufficient to define a molecular weight of about 400, said admixture being dissolved in a solvent.

References Cited by the Examiner

UNITED STATES PATENTS

| | | | |
|---|---|---|---|
| 2,253,235 | 8/1941 | Hempel | 260—57 |
| 2,636,017 | 4/1953 | Schwartzberg | 260—57 |

OTHER REFERENCES

Union Carbide Chemical Company, "Carbowax-Polyethylene Glycols," New York, New York, 1960, pp. 3 and 49.

Payne: "Organic Coating Technology," volume I, John Wiley and Sons, Inc., New York, 1954, pp. 167 and 170.

MORRIS LIEBMAN, *Primary Examiner.*

B. A. AMERNICK, *Assistant Examiner.*